United States Patent [19]
Tacke et al.

[11] 4,193,907
[45] Mar. 18, 1980

[54] FLAME PROOF POLYAMIDE MOULDING COMPOSITIONS

[75] Inventors: Peter Tacke; Dieter Neuray; Dietrich Michael, all of Krefeld, Fed. Rep. of Germany

[73] Assignee: Bayer Aktiengesellschaft, Fed. Rep. of Germany

[21] Appl. No.: 927,860

[22] Filed: Jul. 25, 1978

[30] Foreign Application Priority Data

Jul. 28, 1977 [DE] Fed. Rep. of Germany ....... 2734103

[51] Int. Cl.² .................... C08K 3/02; C08L 77/00
[52] U.S. Cl. ............................. 260/37 N; 260/45.7 P; 525/480; 525/506; 525/508; 525/2
[58] Field of Search ............ 260/45.7 PE, 841, 37 N, 260/45.95 J

[56] References Cited
U.S. PATENT DOCUMENTS

| | | |
|---|---|---|
| 3,778,407 | 12/1973 | Hild et al. .......................... 260/37 N |
| 3,806,488 | 4/1974 | Stone et al. ........................ 260/37 N |
| 3,808,289 | 4/1974 | Okuhashi et al. .................... 260/841 |
| 3,847,861 | 11/1974 | Largman et al. .............. 260/45.7 PE |
| 3,899,462 | 8/1975 | Newbould et al. ................. 260/37 N |
| 3,906,055 | 9/1975 | Fishman .......................... 260/45.95 J |
| 3,931,081 | 1/1976 | Dany et al. ................... 260/45.7 PE |
| 4,067,897 | 1/1978 | Ducloux ....................... 260/45.7 PE |
| 4,092,284 | 5/1978 | Theysohn et al. ................. 260/37 N |

OTHER PUBLICATIONS

Kirk–Othmer, "Encyclopedia of Chemical Technology," vol. 8, 1965, pp. 306 and 307.

Primary Examiner—Hosea E. Taylor
Assistant Examiner—R. A. White
Attorney, Agent, or Firm—Connolly and Hutz

[57] ABSTRACT

Flameproof reinforced and/or filled polyamide moulding compositions containing a combination of red phosphorus and phenol/aldehyde resins as flameproofing agent.

8 Claims, No Drawings

FLAME PROOF POLYAMIDE MOULDING COMPOSITIONS

This invention relates to flameproof polyamide moulding compositions which contain a combination of red phosphorus and phenol/aldehyde resins as flameproofing agent.

It is known from numerous patent specifications that finely divided red phosphorus is a highly effective flameproofing agent for fibre-reinforced and filled polyamide moulding compositions. Unfortunately, the use of red phosphorus for this purpose has the following serious disadvantages:

1. At the high temperatures (above 200° C.) at which the commercially most important aliphatic polyamides (polyamide-6 and polyamide-6,6) are normally processed, the phosphorus reacts with the materials to form highly toxic and foul-smelling phosphorus-hydrogen compounds.

2. The red phosphorus, which is ground to the fineness of dust, shows a tendency, in the presence of air, to undergo dust explosions on coming into contact with hot metal surfaces such as are always encountered during the incorporation of the phosphorus into the polyamide using the conventional processing machines.

3. The natural red colour of phosphorus makes it difficult or impossible to produce light-coloured moulding compositions.

In order to reduce phosphine formation, stabilizers of the type described, for example, in German Offenlegungsschrift No. 2,308,104 (=U.S. Pat. No. 3,883,475) are added to the phosphorus. Unfortunately, the stabilising effect of these stabilisers is incomplete. In addition, most of the compounds active as stabilisers are dark in colour.

Dust explosions can be avoided by using the finely divided phosphorus in the form of concentrates, for example caprolactam concentrates, as described in the German Auslegeschrift No. 1,965,635, (=GB-PS No. 1,326,929) or by coating it with synthetic resins. Coating processes suitable for this purpose are described in German Offenlegungsschrift Nos. 2,408,488 (=GB-PS1,467,789) and 2,428,758.

Unfortunately, the use of a phosphorus concentrate in caprolactam involves considerable complications because, due to its adverse effect both upon flame resistance and upon mechanical properties, the caprolactam has to be removed from the moulding compositions in degassing extruders after the incorporation of the concentrate. The processes for coating phosphorus which are described in German Offenlegungschrift Nos. 2,408,488 and 2,428,758 are also extremely complicated and difficult to carry out on a commercial scale.

According to German Auslegeschrift No. 2,625,691, phosphine formation can be prevented by coating the phosphorus with polymers before it is incorporated into the plastics. Since the phosphorus is present in excess in these flameproofing agent combinations, it is difficult on account of the intensive natural colour of phosphorus to produce light-coloured moulding compositions with adequate flame resistance.

In order to conceal the red colour of phosphorus, for example, it is necessary to use from 2 to 5 times the quantity by weight of standard commercial-grade $TiO_2$ pigments or from 6 to 10 times the quantity by weight of ZnS.

$TiO_2$-contents of from 15 to 30% by weight, however, reduce the elastic properties of the moulding compositions to such an extent that the compositions can no longer be used for commercial purposes.

It has now surprisingly been found that light coloured polyamide moulding compositions having an outstanding flame resistance can be obtained by using with the prior art comparable quantities of a flameproofing agent combination comprising a mixture of red phosphorus with an excess of a phenol/aldehyde resin, preferably a novolak. It was completely unexpected to find that equally favourable flame resistance can be obtained with from one quarter to one third of the usual required quantity of phosphorus, providing the phosphorus is used together with phenol/aldehyde condensates.

Thus it is also possible to conceal the colour of the phosphorus with white pigments to such an extent that self-extinguishing polyamide moulding compositions can also be obtained in light colours and with adequate impact strengths. Particular colours can be adjusted by using various quantities of other pigments, as is known.

Accordingly, the present invention relates to flameproof polyamide moulding compositions containing (I) as flameproofing agent from 0.5 to 20% by weight, preferably 3-18, based on the polyamide, of a mixture of
  (a) from 60 to 95% by weight of phenol/aldehyde resins and
  (b) from 5 to 40% by weight of red phosphorus having an average particle size of less than $200\mu$ and
(II) from 10 to 40% by weight, preferably from 15 to 35% by weight, based on the polyamide of reinforcing materials and/or fillers.

Phenol/aldehyde resins suitable for the purposes of the present invention are preferably linear condensation products of phenols and formaldehyde and/or acetaldehyde softening at temperatures in the range of from $-30°$ to $+350°$ C.

Phenolic compounds from which the resins can be produced include inter alia phenols, n and iso-alkyl phenols containing up to 8 carbon atoms in the side chains, naphthols, hydroxy diphenyls, hydroxy diphenyl ethers, pyrocatechol, resorcinol, hydroquinone, bis-(hydroxyphenyl)-alkanes and/or cycloalkanes, bis-(hydroxyphenyl)-sulphides, bis-(hydroxyphenyl)-sulphones, and hydroxybenzoic acids.

The phenol/aldehyde resins are obtained by known methods of the type described, for example, in Houben-Weyl, Methoden der organischen Chemie, Vol. 14/2, 4th Edition, pages 273 et seq.

The molar ratio of aldehyde to phenolic compound is generally in the range of from 0.3:1 to 1.2:1 and preferably in the range of from 0.5:1 to 0.9:1. It is preferred to use novolaks obtained by acidic condensation.

In order to increase the melt viscosity of the phenol/aldehyde resin the resin may be crosslinked with boric acid, phosphoric acid, phosphorous acid, esters of phosphorus and phosphoric acid, polybasic carboxylic acids, polyfunctional isocyanates, polyfunctional epoxides or $PCl_3$. Up to 25% by weight of crosslinking agent may be added to the resin.

In addition, it may be advantageous to convert the phenol/aldehyde resins into metal salts, since the effectiveness of the flameproofing agent combination is generally improved in this way. Metals which may be used for salt formation include alkali metals, alkaline earth metals, zinc, cadmium, tin, lead, antimony, aluminium, copper, manganese, iron, cobalt and nickel. The resins may contain one or more of these metals. The metal salts may be produced, for example, from the phenol/aldehyde resins and the oxides, hydroxides, carbonates, acetates, formates, phosphate and borates of the above mentioned metals. These metal compounds, preferably the oxides, may be added to the resins in quantities of up to 15% by weight.

The phenol/aldehyde resins may also be grafted onto the polyamide component of the moulding compositions according to the present invention provided that the crosslinking agent (for example, a diepoxide) in the resin has not, or has not completely, reacted with the resin before incorporation of the flameproofing agent into the polyamides and is able to react with the polyamide.

Polyamides which may be used for the moulding compositions according to the present invention are PA-6, PA-6,6, mixtures thereof, block polymers and copolymers of ε-caprolactam, adipic acid, hexamethylene diamine, also PA-11 and PA-12 and polyamides synthesised from aliphatic diamines and adipic acid and/or isophthalic acid and/or terephthalic acid and/or sebacic acid and/or azelaic acid and/or cyclohexane dicarboxylic acid.

In addition to hexamethylene diamine, suitable aliphatic diamines are 2,2,4- and 2,2,4-trimethyl hexamethylene diamine, isophorone diamine, 1,3- and 1,4-bis-aminocyclohexyl, bis-aminocyclohexyl alkanes and xylylene diamines.

In addition, it is also possible to use polyamides produced from the above-mentioned aliphatic dicarboxylic acids and aromatic diamines such as, for example, m and p-phenylene diamine, and also polyamide mixtures and copolyamides of any of the above-mentioned components, providing that aliphatic and partially aliphatic polyamides are formed. Aliphatic polyamides, especially polyamide 6 and polyamide-6,6 are preferably used.

The average diameter of the phosphorus particles in the concentrates is less than 200 μm, preferably less than 100 μm and, with particular preference, less than 20 μm.

The phosphorus used for the flameproofing agent mixture according to the present invention may be any of the standard commercial-grade, coloured allotropic forms of red phosphorus.

To produce the flameproofing agent mixture or concentrate, the powdered red phosphorus is preferably stirred or kneaded into the moulded phenol aldehyde resin. It is possible although not necessary for the purposes of the present invention, to dilute the resin with solvents during production of the concentrates. The concentrates may be produced in stirrer-equipped vessels, kneaders and also extruders.

The resin may also be mixed with the phosphorus in powder form and the resulting mixture made up into a granulate or into pellets, optionally under the effect of heat.

In addition, the resin may also be condensed from its starting components in the presence of the phosphorus.

The liberation of toxic phosphorus-hydrogen compounds is particularly minimal where the flameproofing agent combinations according to the present invention are used. The liberation of phosphines may be further reduced by incorporating small quantities of $MoS_2$, HgO, $PbO_2$, CuO, and/or ZnO into the moulding compositions.

The flameproofing agent mixtures or concentrates according to the present invention may be incorporated into the polyamides, optionally together with reinforcing materials and/or fillers, pigments and other additives, using conventional machines. It is preferred to use twin-screw extruders.

Pigments for concealing the natural red colour of the phosphorus and for adjusting a particular colour may either be already present in the combination of flameproofing agents or alternatively may be incorporated into the moulding compositions together with, or separately from the flameproofing concentrates.

Preferred pigments for concealing the natural red colour of the phosphorus are $TiO_2$, ZnS and $BaSO_4$. White pigments are used in quantities of from 0.2 to 10 times and preferably in quantities of from 1 to 5 times the quantity of phosphorus contained in the moulding compositions.

The fillers and reinforced materials, which are present in the moulding compositions according to the present invention include inter alia glass fibres, asbestos fibres, glass beads, talcum, wollastonite, Microvit, chalk, quartz. The usual coloured pigments, dyes, processing aids and stabilizers such as salts or stearic acid and sterically hindered phenols may also be incorporated into the polyamide moulding compositions.

The moulding compositions according to the present invention may be processed into mouldings using conventional injection-moulding machines. The mouldings are flame resistant according to UL, Subject 94, V1 or V0.

EXAMPLE

The following resins were produced in accordance with Houben-Weyl, Methoden der organischen Chemie, Vol. 14/2, 4th Edition, Makromolekulare Stoffe II, pages 273 et seq: (an adequate description of the production of phenol/aldehyde resins is disclosed in Kirk-Othmar, $2^{nd}$ Edition, Vol. 15, page 182)

A. Novolak of phenol and formaldehyde, softening range 113°–119° C. (page 273).

B. Novolak of p-phenyl phenol and formaldehyde, softening range 87°–123° C. (page 274).

C. Novolak of p-cresol and formaldehyde produced in accordance with example 2 of the above-mentioned publication but with 600 g of p-cresol instead of 945 of p-phenyl phenol, softening range 78°–112° C.

D. Novolak of resorcinol and formaldehyde, softening range 98°–121° C. (page 274).

E. Novolak of phenol and acetaldehyde, softening range 117°–122° C. (page 275).

F. Resol of phenol and formaldehyde, highly viscous at 20° C. (page 278).

To produce the flame retarding mixtures, 20 parts by weight of red phosphorus were stirred into 80 parts of molten phenol/aldehyde resin, after which the resin was optionally crosslinked and/or partially converted into a metal salt. The conditions under which mixtures I to XIII were produced are set out in Table 1. After the completed flame retarding mixtures had been poured out into metal sheets, they hardened quickly into brittle products which could easily be size-reduced to a particle diameter of from about 2 to 4 mm.

EXAMPLES 1-16

Mixtures I to XIII were incorporated, optionally together with fillers, pigments and auxiliaries, into polyamide-6,6, which had been reinforced with 35% by weight of glass fibres and which had a relative viscosity of 3.07, as measured using a 1% solution of the polyamide in m-cresol at 25° C., in a Rei fenhauser single-screw extruder having a screw diameter D of 30 mm and a screw length of 20 D. (D=diameter) The compositions, the incorporation conditions and the flammability of the mixtures are shown in Table 2.

The flammability of the moulding compositions in accordance with UL, Subject 94, was tested using ASTM test bars measuring approximately 1.5×12.5×127.5 mm and 3×12.5×127.5 mm which were produced by injection moulding.

Table 1

Production of mixtures I to XIII

| | Resin | Resin temperature at the addition of $P_{red}$ (°C.) | further additives in % by weight based on resin + $P_{red}$ total | Resin temperature at the addition the additives, (°C.) | Temperature of mixture on discharge from the production vessel, (°C.) | |
|---|---|---|---|---|---|---|
| I | A | no $P_{red}$ | diepoxide*, 15 | | 180 | 230 \ |
| II | A | " | triethyl phosphate, 3.5 | | 150 | 245 } Comparison tests |
| III | A | " | ZnO, 1.3 | | 50 | 230 / |
| IV | A | 150 | — | | — | 180 |
| V | A | 150 | diepoxide*, 7/ZnCO₃, 0.5 | | 180 | 250 |
| VI | A | 150 | boric acid, 1.1 | | 180 | 250 |
| VII | A | 150 | CaO, 1.3 | | 50 | 250 |
| VIII | B | 165 | FeCO₃, 2 | | 180 | 250 |
| IX | C | 140 | diepoxide*, 3.5 | | 170 | 230 |
| X | C | 140 | H₃PO₄, 0.5 | | 150 | 235 |
| XI | D | 165 | diepoxide*, 2.4 | | 175 | 250 |
| XII | E | 170 | diepoxide*, 4 | | 190 | 240 |
| XIII | F | 150 | tolylene diisocyanate, 3 | | 180 | 200 |

*Diglycidyl ether of 2,2-bis-(4-hdyroxyphenyl)-propane (bisphenol A.)

Table 2

Composition of the flameproofed polyamide moulding compositions

| Example No. | | Concentrate of/parts by weight | Further additives/ parts by weight | Melt temperature °C. | % by weight of $P_{red}$ in moulding composition | Flammability according to UL, Subject 94, test bar thickness | | Colour of the test bars |
|---|---|---|---|---|---|---|---|---|
| | | | | | | 1.5 mm | 3 mm | |
| 1 | \ | A/15 | — | 285 | — | burns up | burns up | beige |
| 2 | } Comparison Examples | I/15 | — | 285 | — | burns up | burns up | beige |
| 3 | } | II/15 | — | 285 | — | burns up | burns up | beige |
| 4 | / | III/15 | — | 285 | — | burns up | burns up | beige |
| 5 | | IV/12 | TiO₂/6 | 285 | 2.27 | V 1 | V 1 | light red |
| 6 | | IV/10 | TiO₂/5 | 285 | 1.9 | burns up | V 1 | light red |
| 7 | | V/12 | TiO₂/6 | 285 | 2.1 | V 0 | V 0 | light red |
| 8 | | VI/12 | TiO₂/6 | 285 | 2.25 | V 1 | V 0 | light red |
| 9 | | VII/12 | TiO₂/6 | 285 | 2.23 | V 1 | V 0 | light red |
| 10 | | VIII/12 | TiO₂/6 | 285 | 2.21 | V 0 | V 0 | light red |
| 11 | | IX/12 | TiO₂/6 | 285 | 2.19 | V 1 | V 1 | light red |
| 12 | | X/12 | TiO₂/6 | 285 | 2.24 | V 1 | V 1 | light red |
| 13 | | XI/12 | TiO₂/6 | 285 | 2.21 | V 1 | V 0 | light red |
| 14 | | XII/12 | TiO₂/6 | 285 | 2.18 | V 0 | V 0 | light red |
| 15 | | XIII/12 | TiO₂/6 | 285 | 2.2 | V 1 | V 1 | light red |
| 16 | | V/14 | ZnS/12 | 290 | 2.28 | V 0 | V 0 | light red |

EXAMPLES 17-21

Various polyamides were flameproofed with the concentrate V in the same way as described in the preceding Examples. The composition of the polyamides and the results of the flammability test are set out in Table 3.

Table 3

| Test No. | Polyamide component | Parts by weight in moulding composition | Concentrate /Parts by weight | Further additives/ parts by weight | Melt temp. °C. | % by weight of $P_{red}$ in moulding composition | Flammability according to UL, Subject 94, test bar thickness | | Colour of the test bars |
|---|---|---|---|---|---|---|---|---|---|
| | | | | | | | 1.5 mm | 3 mm | |
| 17 | PA-6,6 $\eta rel = 3.03$ / | 58 | V/12 | wollastonite /30 | 285 | 2.23 | V 0 | V 0 | red |
| 18 | PA of isophthalic acid and hexamethylene diamine, $\eta rel = 2.64$ / | 63 | V/12 | asbestos powder/25 | 280 | 2.23 | V 0 | V 0 | red |
| 19 | PA-6 with 35% by weight of glass fibres. $\eta rel = 2.98$ / | 86 | V/14 | TiO₂/6 | 270 | 2.45 | V 1 | V 0 | light red |

Table 3-continued

| Test No. | Polyamide component | Parts by weight in moulding composition | Concentrate /Parts by weight | Further additives/ parts by weight | Melt temp. °C. | % by weight of $P_{red}$ in moulding composition | Flammability according to UL, Subject 94, test bar thickness | | Colour of the test bars |
|---|---|---|---|---|---|---|---|---|---|
| | | | | | | | 1.5 mm | 3 mm | |
| 20 | mixture of 50/50 % by weight of the PA (glass fibre reinforced) of test numbers 1 + 19 / | 86 | V/14 | $TiO_2$/6 | 280 | 2.45 | V 0 | V 0 | light red |
| 21 | PA-66, with 35% by weight of glass fibres as in test number 1 / comparison test | 95 | — | $P_{red}$/5 | 275 | 5 | burns up | V 1 | red |

What we claim is:

1. Flameproof polyamide moulding compositions containing
(I) from 0.5 to 20% by weight of a flameproofing agent comprising a mixture of
 (a) from 60 to 95% by weight of at least one phenol-/aldehyde resin and
 (b) from 5 to 40% by weight of red phosphorus having an average particle size of less than 200μ and
(II) from 10 to 40% by weight of at least one reinforcing material and/or filler.

2. Polyamide moulding compositions as claimed in claim 1, wherein the phenol/aldehyde resin contains up to 25% by weight of a crosslinking agent.

3. Polyamide moulding compositions as claimed in claim 1, wherein the phenol/aldehyde polycondensation resin is a novolak.

4. Polyamide moulding composition as claimed in claim 1, wherein the polyamide is polyamide 6 or polyamide-6,6.

5. Polyamide moulding compositions as claimed in claim 1, wherein the reinforcing material is glass fibres.

6. Light coloured polyamide moulding compositions as claimed in claim 1 containing white pigments in quantities of from 0.2 to 10 times the quantity of the red phosphorus.

7. Polyamide moulding compositions as claimed in claim 1, wherein the phenol/aldehyde resin is present in the form of a metal salt of a metal selected from the group consisting of alkali metals, alkaline earth metals, zinc, cadmium, tin, lead, antimony, aluminum, copper, manganese, iron, cobalt and nickel.

8. Polyamide moulding compositions as claimed in claim 7, wherein up to 15% by weight of a metal oxide, hydroxide, carbonate, acetate, formate, phosphate or borate is added to the phenol/aldehyde resin to form the metal salt thereof.

* * * * *